(12) United States Patent
Fiks et al.

(10) Patent No.: US 6,605,767 B2
(45) Date of Patent: Aug. 12, 2003

(54) MUSIC LEARNING SYSTEM INCLUDING INSTRUMENT AND METHOD

(75) Inventors: Ethan Fiks, New York, NY (US); Peter Sippach, Tenafly, NJ (US)

(73) Assignee: Music Path Company, Inc., New York, NY (US)

( * ) Notice: Subject to any disclaimer, the term of this patent is extended or adjusted under 35 U.S.C. 154(b) by 0 days.

(21) Appl. No.: 09/993,584

(22) Filed: Nov. 6, 2001

(65) Prior Publication Data

US 2002/0073826 A1 Jun. 20, 2002

Related U.S. Application Data

(60) Provisional application No. 60/246,026, filed on Nov. 6, 2000.

(51) Int. Cl.[7] .................................................. G10C 3/12
(52) U.S. Cl. ................. 84/423 R; 84/477 R; 84/471 R; 84/470 R; 84/478; 84/479 A; 84/485 R; 84/402
(58) Field of Search .......................... 84/423 R, 477 R, 84/471 R, 470 R, 478, 479 A, 485 R, 402

(56) References Cited

U.S. PATENT DOCUMENTS 2,347,950 A * 5/1944 Huish .......................... 84/478
2,943,527 A * 7/1960 Hanert ......................... 84/403
3,978,756 A * 9/1976 Feldman ................... 84/470 R
4,226,155 A * 10/1980 Ferdinand ..................... 84/635
5,920,023 A * 7/1999 Ravagni et al. ........... 84/485 R

FOREIGN PATENT DOCUMENTS

JP          9-56790      * 3/1997

* cited by examiner

Primary Examiner—Shih-Yung Hsieh
(74) Attorney, Agent, or Firm—W. Patrick Quast, Esq.

(57) ABSTRACT

A musical learning system including an instrument and method is disclosed. The instrument is comprised of a rectangularly shaped box designed for convenient handling by an operator in a manner analogous to other musical instruments such as a piano, a guitar, or a horn. Thirteen movable buttons on the top surface of the box sound eight natural notes and five notes of sharps and flats when pressed by the operator, the sounds being produced by either a built-in, acoustic or electronic sound system. Easily removable attachments having instructive musical notations are temporarily secured above and below the buttons can be used in a predetermined sequence, thereby enabling the operator to grasp music concepts over a relatively, brief period of time. In addition, in the electronic version, an "octave-up" switch enables an operator to sound a note one or more octaves higher for each of the buttons; and a "mute" bar allows the operator to silence a note being produced, if desired. One methodology for employing the instrument in a learning mode is described.

23 Claims, 9 Drawing Sheets

MUSIC LEARNING SYSTEM INCLUDING INSTRUMENT AND METHOD

This application claims the benefit of U.S. Provisional Application No.: 60/246026, filed Nov. 6, 2000. This invention relates to a learning tool and method to facilitate the reading of music and understanding the basic organization of music theory.

BACKGROUND

Traditional methods of beginning to learn music have included instruments such as the recorder, xylophone, and keyboard, none of which incorporate learning methods in and of themselves. In other words, simply looking at or attempting to play any of these instruments gives no insight into formal musical subjects, which are necessary to a student's study of music.

One educational standard currently in use is the recorder, which has the following drawbacks:

1. The organization of notes is unclear because the fingerings do not yield higher and lower notes in a linear fashion. Students learn about notes piecemeal without seeing the big picture of how they relate to one another in pitch and how they relate to the musical octave.
2. The recorder is difficult to play. It is not easy to produce a clear tone, and all to easy to make a squeak on a recorder. It is not hard to imagine the disruption of classroom learning that comes from putting a squeaky instrument in the hands and mouths of young children.
3. For hygienic reasons, it is inadvisable for students to share a single recorder in case, for example, one student forgets to bring his or her instrument. Aerophones invite this problem.
4. The recorder can only sound one note at a time, and therefore cannot be used to learn chords.

So why is the recorder so widely used? Tradition, perhaps, and because it is inexpensive, rugged, and portable, easily fitting in a school backpack. The present invention similarly satisfies the latter three criteria, and certainly keeps one foot firmly in tradition.

Other musical instruments currently in use for musical education also have shortcomings. Many xylophone-type beginner's instruments are non-chromatic. Thus, they become obsolete early in the student's musical development. Keyboards, which may or may not be portable and/or affordable, invite the musical novice to tape note names or color-codes on to the keys in an effort to remember which notes are where. Many of us have probably observed this phenomenon. However, this practice invites the novice to create his or her own learning method, which he or she may be inadequately prepared to do. Also, it is difficult to remove these learning "crutches" once they are affixed, making the student reliant on them when they should be internalizing the related concepts and moving forward. Also, many of the home electronic keyboards are overloaded with eye- and ear-catching features. They entice the consumer with preset rhythms and patterns to play along with, "auto-play" (where the instrument plays a tune on its own), and numerous natural and synthetic timbres. Products by such companies as Casio and Yamaha that fit this description are in the popular consciousness and need no further elaboration. While fun and gratifying, the plethora of extra elements definitely distracts from learning music on these instruments.

Other children's instruments are closer to toys, whereas the present invention strikes a delicate balance between education and entertainment. Some of the very simple portable keyboards are monophonic (can only sound one note at a time) and therefore are useless for learning chords. The Carry Along Keyboard, made by Diversified Specialists, Inc., has numbers over notes, letters over flats and sharps, and note letters under notes—quite a confusing layout for a child to interpret. These aids, whatever they may mean, are not removable or interchangeable. This instrument thus lacks the developed progressive learning approach integral to the present invention. Also, importantly, it lacks the beauty and visual excitement of the present invention, or the means to hold it in different ways.

The Kid Keys by Playskool has note names permanently affixed above the keys for natural notes A through G. However, although sharps and flats can be played, they are in no way labeled. Also, the concept of an octave, which the present invention makes so clear with its one octave's worth of buttons and separate Octave-Up button, is not explained, leaving the student to wonder why the same note letters repeat. (The same appears true for the Carry Along Keyboard above.) This instrument is monophonic. Also, it suffers from the distractions noted above with its inclusion of various timbres and pre-set beats to play along with. Also essentially, both the Kid Keys and the aforementioned Carry Along Keyboard are based on the piano keyboard, whereas the present invention triggers sound through slightly larger than fingertip-sized buttons, which are unique and not tied to a pre-existing standard instrument.

The Disney "Mickey Mouse" instrument including its colored keys makes use of the keys to play a musical matching game, where each button lights up and the user then presses that button as a means to play a song. This instrument may be a fun and enriching introduction to music, however it does not aid in the study of formal musical topics. It is more a game than a user-driven instrument.

The prior art also reveals numerous instruments, charts, and methods as musical learning aids. For example, U.S. Pat. No. 5,920,023, issued Jul. 6, 1999, teaches the use of a chart that can be affixed to a stringed instrument such as a guitar or violin. Also, U.S. Pat. No. 2,943,527, issued Jul. 5, 1960, teaches utilizing a xylophone-like instrument in which the keys can be removed and then replaced in the order necessary, according to provided song charts, to execute a song by simply playing the keys in a row. And U.S. Pat. No. 2,347,950, issued May 2, 1944, teaches the use of a chart for placement on a piano or other keyboard equipped instrument so as to allow persons without previous knowledge to immediately read music and play the music on a keyboard.

While the above described commercially available music teaching devices and suggested instruments and methods in the prior art noted above provide a valid initial exposure to music, they do not envision the advanced concepts clearly presented by the learning system of the present invention.

Therefore it is the primary object of the present invention to provide a progressive learning tool for acquiring the fundamentals of music.

An additional object of the present invention is to provide a music learning instrument and method encompassing both serious student requirements and decorative eye appeal.

Yet another object of the present invention is to provide an elegant learning method in which musical concepts relate to physical parts of the instrument and then to the sound produced by the instrument.

Still another object of the present invention is to permit the student to focus on the natural notes at first, with the other chromatic notes also available for more advanced study.

A further object of the present invention is to equalize the treatment given to each of the twelve notes per octave.

An additional object of the present invention is to introduce the student to an understanding of sharps and flats at an early stage.

SUMMARY

These and other objects have been obtained by the present invention of an instrument and method for learning music.

It occurred for the above noted reasons that there is a need for a simple, relatively inexpensive instrument and learning method for beginner music instructions to enable students to more quickly grasp fundamental music concepts. Applicants envisioned a basic musical instrument that could be held similar to a variety of instruments, such as the piano, guitar, or horn, to thereby introduce an element of fun so as to assist in focusing the student's attention on learning music basics. The instrument devised has thirteen large buttons on its top surface, dividing the musical octave from C to C in half steps. Eight buttons are of one color (e.g. white) denoting natural notes, and five buttons are a different color (e.g. black) denoting flats and sharps.

Four attachments are designed for convenient connection to the top surface of the instrument. A first attachment color-codes the natural notes according to, for example, the colors of the rainbow (or other suitable color arrangements), and places the color of the lower neighboring natural note above the button with a sharp symbol (♯) for sharps and the color of the higher neighboring natural note below the button with a flat symbol (♭) for flats. A second attachment puts the note names above the buttons and the musical notes on a standard staff notation (treble clef) below the buttons. A third attachment places only the musical notes on a standard staff notation below the buttons. A fourth puts only the note names below the buttons.

A current version of the present invention would consist of an instrument in the shape of a rectangular box measuring approximately 14" in length, 4" in width, and 2" in height. Materials of construction can be wood or an attractive plastic material. The thirteen buttons are secured linearly a spaced distance from one another on the top surface of the box.

The instrument can be made available in an acoustic version, and also an electronic version. In the acoustic version xylophone-like internal keys will provide the sound, and in the electronic version sound will be provided by a suitable sound chip as will be more fully explained. The electronic version will also have an "Octave-Up" button on the top surface to the left of the playing buttons which shifts each of the thirteen main buttons to a note at least one octave higher, and a "Mute Bar" on the right side which cuts off the sound produced, and which could also feature a light to indicate when musical rests (silences) are taking place.

A suggested method for using the present invention would be as follow:

Step 1: Student is instructed to first acquaint himself with the musical alphabet using Attachment 4. (Note: The student correctly looks at Attachment 4 first rather than Attachment 1. However, when it comes to playing a tune, the student uses Attachments 1, 2, 3, 4 in order, hence the logic of the numbering.)

Step 2: Use Attachment 2 to help you play the C major scale, and thereby become familiar with the natural notes.

Step 3: Play one or more familiar songs (in the key of C) (from the book or manual that would be supplied) using Attachment 2, which allows the student to match up the standard notation on the sheet music with the standard notation and note names on the Attachment, and with the appropriate button to press to sound a certain note. Because the student will recognize the tune, it is not necessary for he or she to completely understand the rhythmic notation in order to make the song sound right.

Step 4: Learn about other key concepts, such as rhythmic notation and sharps and flats.

Step 5: Backtrack. Clap or play the rhythms of the previous familiar tune on one note. Learn the counting of the rhythms. Perhaps incorporate use of a metronome at progressively more challenging tempos (speeds).

Step 6 (optional): Play a familiar song from color-coded sheet music using Attachment 1. Actually, the student can try this at any time, and probably will be tempted to do so. However, the layout of this method encourages the student to at least try to work with some form of standard notation first because it has greater, more universal, educational value.

Step 7: Play the song again with Attachment 2, this time keeping track of the rhythm and trying to rely less on the aid of the Attachment—It is a crutch that will soon be removed.

Step 8: Play the song with Attachment 3, which has musical notation, but lacks note names. One less learning aid means the student has to internalize more information.

Step 9: Play the song with Attachment 4, which just gives the note names, which are not written anyway in the sheet music—meaning this last crutch gives only minimal assistance to the student.

Step 10: Play the song with no Attachment. By now the student should be up an running on his or her own.

Obviously there should be some flexibility in the learning sequence because no two students learn exactly alike.

BRIEF DESCRIPTION OF THE DRAWINGS

FIG. 3 is a top plan view of a second attachment used in conjunction with the instrument depicted in FIG. 1.

DETAILED DESCRIPTION

Figure 1:
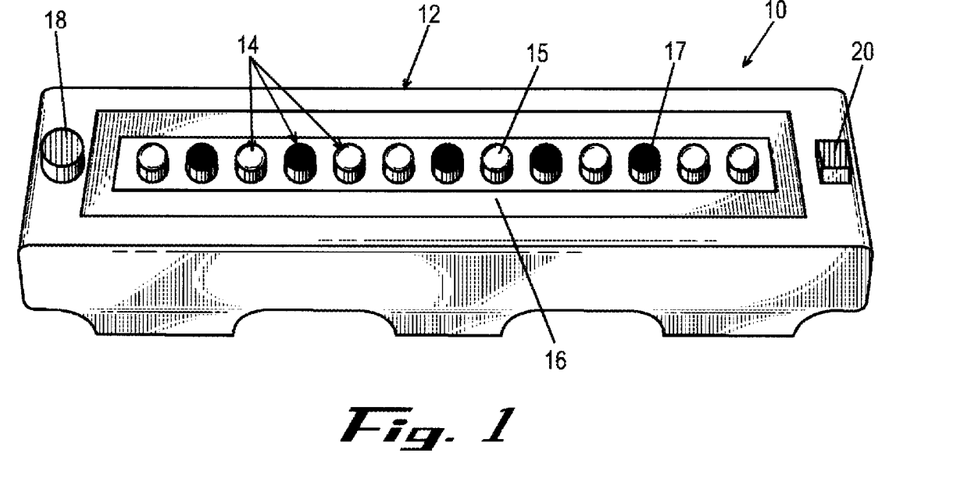
FIG. 1 is a top plan view of one version of the instrument portion of the present invention shown without attachment and with strips of VELCRO™ affixed to the top surface.
Figure 9:
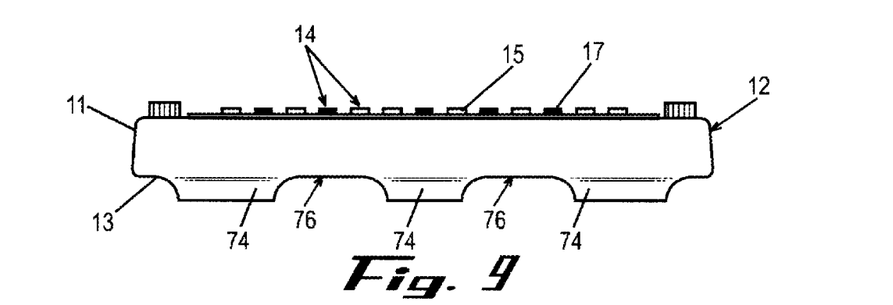
FIG. 9 is a side elevational view of one version of the instrument of the invention, shown placed on a flat surface to illustrate the securing feet and hand grasp cut-outs at the base of the instrument.

Turning now to the drawings, wherein similar structures having the same function are denoted with the same numerals in the various views, in FIG. 1, a version of the musical instrument 10 of the invention is depicted. The instrument 10 is designed to be portable, and can measure, for example, 14" in length, 4" in width, and 2" in height. The instrument is comprised of a generally rectangularly shaped box 12, the box having an upper section 11, and lower section 13 (FIG. 9). The top surface of the upper section 11 has at least eight movable buttons 14 affixed in a linear fashion centrally positioned along the length of the top surface. In this eight button version of the invention each button 14 would be used to sound each natural note for one octave C to C. Sharps and flats can be made available by way of an additional switch (not shown) which can be pushed to the right for a sharp (the next higher note) or to the left for a flat (the next lower note).

In the preferred embodiment shown, the instrument 10 has at least 13 movable buttons, 14, affixed, in a linear arrangement, to the top 12. The buttons 14 are for producing notes that divide the musical octave from C to C in half steps when pressed downward by an operator 82. As best seen in FIG. 9 there are eight light (white) colored buttons 15 which sound the eight natural notes and five dark-colored (black) buttons 17 for sounding sharps and flats.

Figure 2:
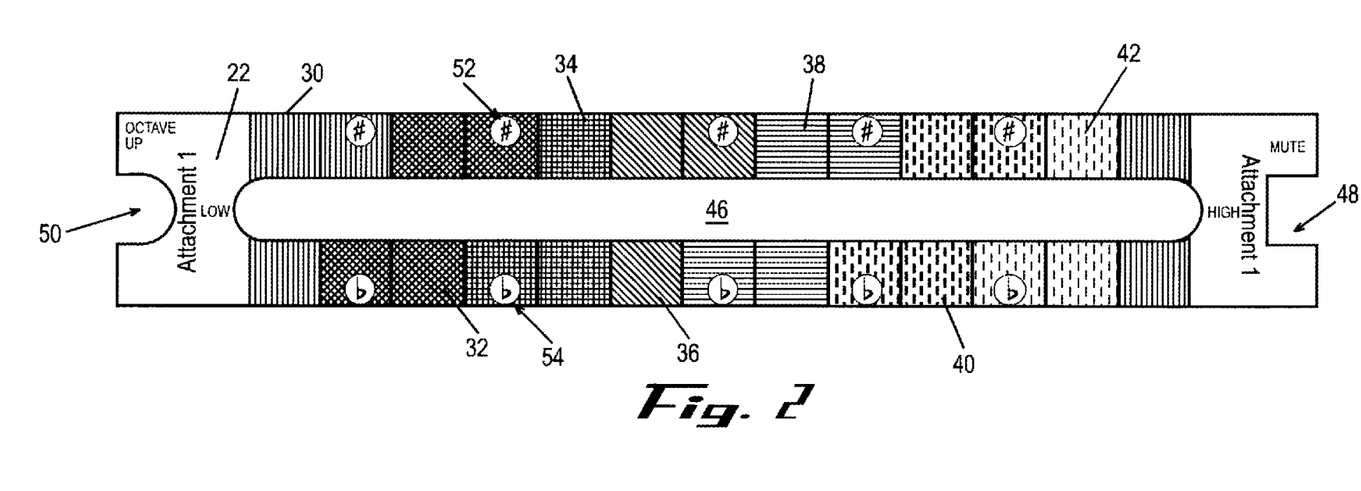
FIG. 2 is a top perspective view of a first attachment used in conjunction with the instrument depicted in FIG. 1.
Figure 4:
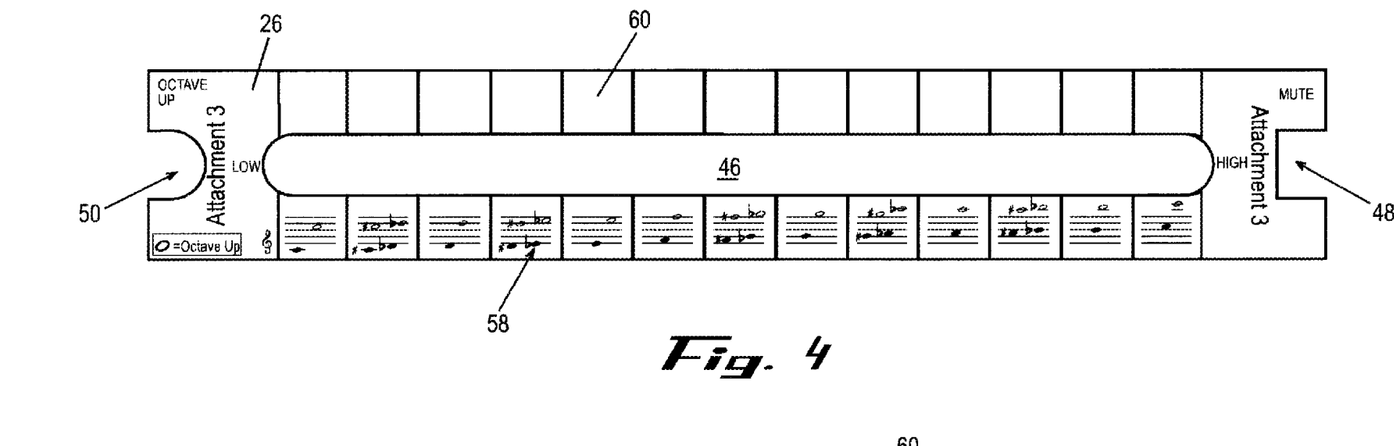
FIG. 4 is a top plan view of a third attachment used in conjunction with the instrument depicted in FIG. 1.
Figure 5:
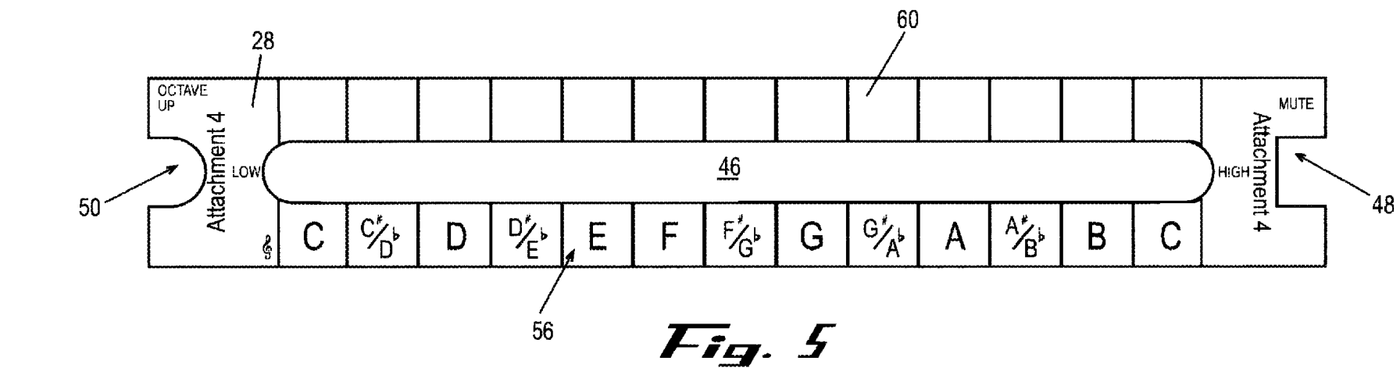
FIG. 5 is a top plan view of a fourth attachment used in conjunction with the instrument depicted in FIG. 1.
Figure 6A:
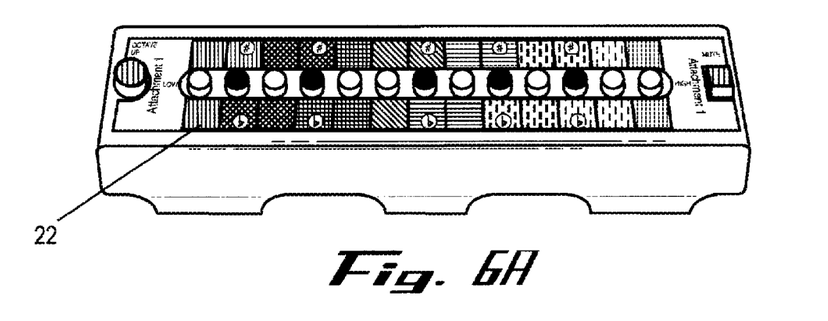
FIGS. 6A–6D are top perspective views showing the first, second, third, and fourth attachments secured in sequence to the top surface of one version of the instrument of the invention.
Figure 6B:
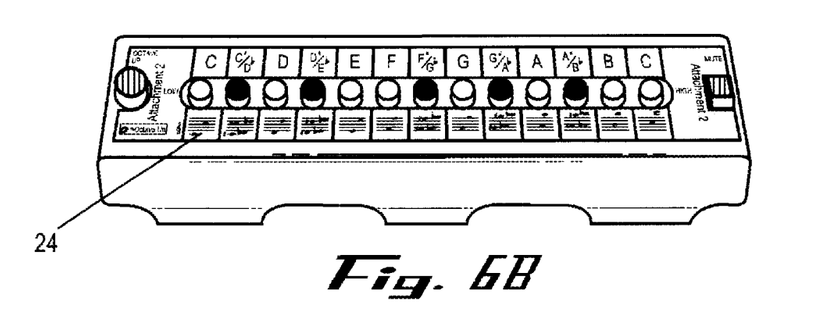
Figure 6C:
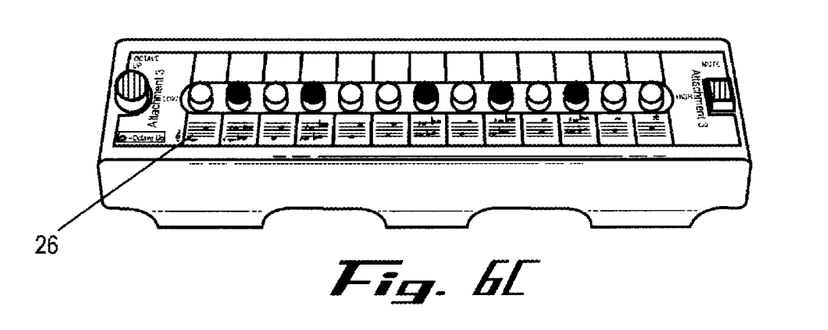
Figure 6D:
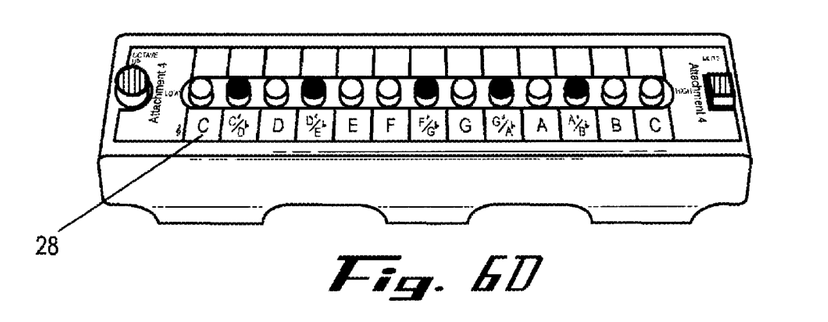

Four attachments (22, 24, 26, 28—FIGS. 2–5) are removably secured to the surface of the instrument 10, being placed over the buttons in a manner so as to elucidate the sound produced by each button in different ways. The attachments are numbered 1–4 for proper identification by the student when used in association with written instructions. Attachment 1 (22—FIG. 2) color-codes the natural notes according to a suitable color scheme, and places the color of the lower neighboring natural note above the button with the sharp symbol, 52, for sharps, and the color of the higher neighboring natural note below the button with the flat symbol 54 for flats. In FIG. 2 (attachment 1) colors are denoted by employing the standard drawing symbols in accordance with 37 CFR 1.84 (G) as follows: Red 30, Orange 32, Yellow 34, Green 36, Light Blue 38, Dark Blue 40, and Violet 42.

As shown in FIGS. 2–5 each of the four attachments has an upper and lower portion for the placement thereon of musical notation, with these upper and lower portions being separated by a middle area, cut-out portion 46 for convenient placement above and below the buttons 14 on the instrument. Left and right end portions of each of the attachments have an area for denoting information, such as the attachment number, and a hemispherical cut-out area 50 in the left end portion, and a one-side open rectangular cut-out area 48 in the right end portion. The purpose of these end cut-outs is to key the attachments for correct orientation using an "Octave Up" switch 18 and a "Mute" bar 20 as the complementing keys. The function of these will be more fully explained below.

Attachment 2 (24—FIG. 3) puts the note names 56 above the buttons and the musical notes in standard staff notation (treble clef) 58 below the buttons 14. A third attachment (26—FIG. 4) places only the musical notes in standard staff notation 58 below the buttons, with the upper portion 60 of this attachment being blank. A fourth attachment (28—FIG. 5) puts only the note names 56 below the buttons, with the upper portion 60 of this attachment being blank. FIGS. 6A, 6B, 6C and 6D illustrate the placement of the four attachments on the instrument 10, in relation to the "Octave Up" switch 18 and the "Mute" bar 20.

The above noted attachments can be fabricated in a number of convenient ways out of paper, plastic, or metal. For example, semi-rigid laminated paper, available from Avery Denison Label Co., Diamond Bar, Calif., can be employed. A convenient method for temporarily securing the attachments to the top surface of the instrument 10 are VELCRO™ strips 16 placed above and below the buttons on the instrument top surface, and cooperating VELCRO™ strips (not shown) being affixed to the bottom surface of the upper and lower portions of each one of the attachments.

Figure 7:
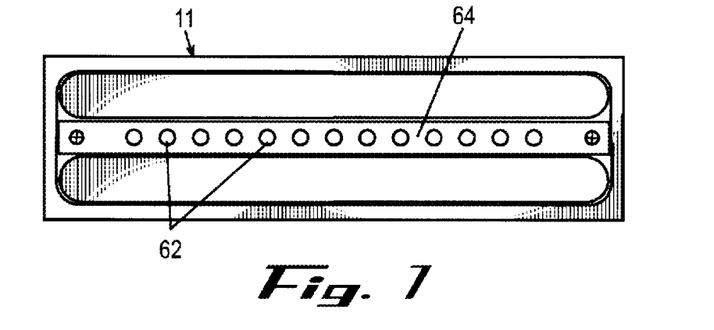
FIG. 7 is a bottom plan view of one version of the instrument of the invention showing the base of the thirteen buttons with a steel holding strip in place.
Figure 8:
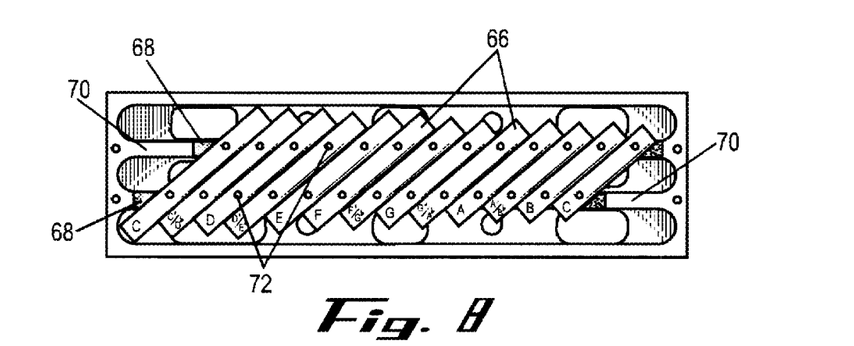
FIG. 8 is a bottom plan view of one embodiment of an acoustic version of the instrument of the invention, showing the xylophone-like keys in place.
Figure 10:
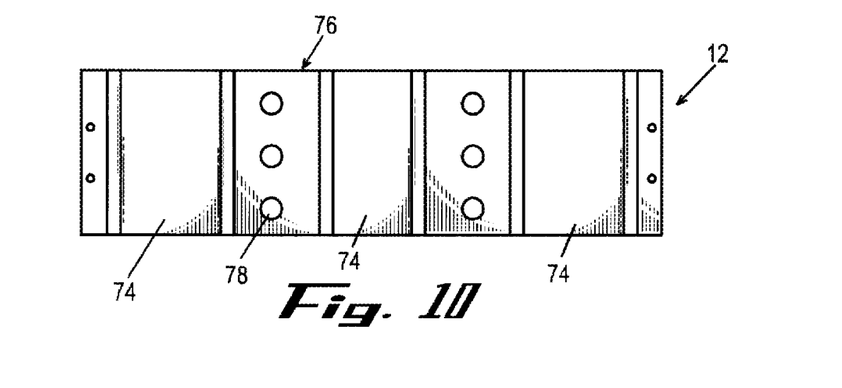
FIG. 10 is a bottom plan view of one version of the instrument of the invention, illustrating sound improving openings in the base of the instrument.
Figure 11:
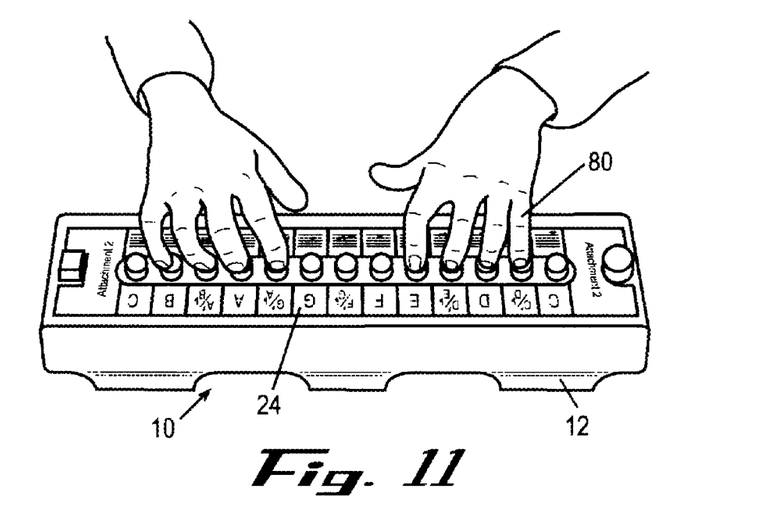
FIG. 11 is a perspective view showing one version of the instrument of the invention in use, and including the attachment of FIG. 3.
Figure 12:
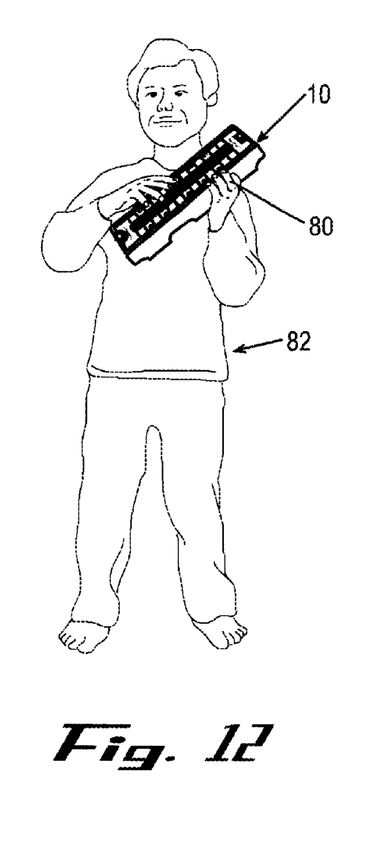
FIG. 12 is a view similar to FIG. 11 showing another mode for playing this version of the instrument of the invention.
Figure 13:
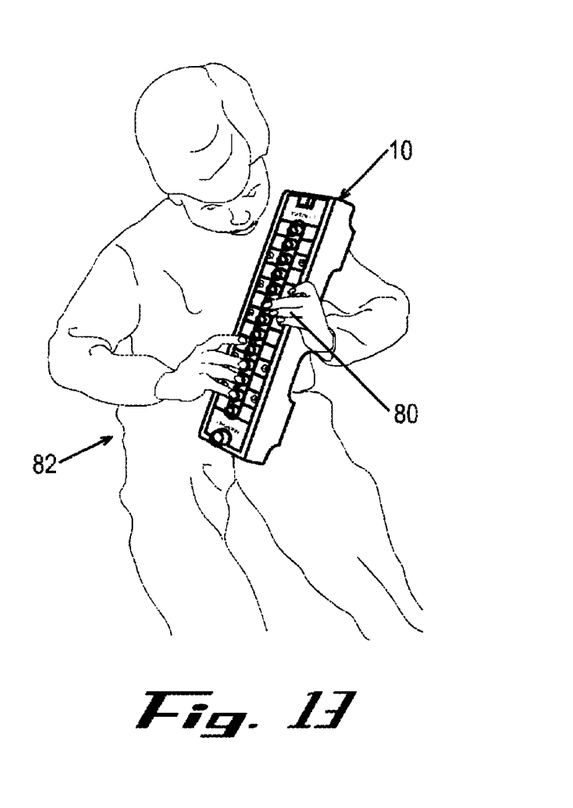
FIG. 13 is a view similar to FIGS. 11 and 12 showing still another mode for playing this version of the instrument of the invention.

The generally rectangularly shaped box 12 of the instrument 10 can be fabricated in a number of attractive ways, including wood, wood-like plastics, or colored plastics, or metal. The box 12 is fabricated in two separable sections, an upper section 11 and a lower section 13. As seen in FIG. 7 the upper section 11 has a substantially hollow interior area for the placement therein of sound producing mechanism. The lower section (13—FIG. 9) of the box has feet, 74, for convenient positioning on a flat surface, with archways 76 formed between the feet. The base of the lower portion has openings 78 (FIG. 10) within the archway areas to further facilitate sound production. The instrument's ergonomic design allows it to be held like various other instruments (FIGS. 11, 12, 13), and its pleasing exterior establishes it both as a serious tool for artistic creation and as an art work in itself. When held in upright horn-like position (FIG. 12), the fingers 80 of the operator 82 on both hands can reach around to the top of the instrument 10 and easily access and press six or seven keys in their vicinity. In FIG. 13 the instrument is shown in a manner similar to a guitar, and in FIG. 11 the instrument is shown being played similar to playing a piano-like instrument.

The instrument 10 can be designed as either an acoustic instrument or an electronic instrument Both sound producing systems are known to the art. In the case of the acoustic version of the instrument, the buttons 14, which can be fabricated from aluminum rod, are tapered so as to have pointed ends 62 (FIG. 7). A tapered spring (not shown) surrounds each button, and are held in place within the hollow area of the upper portion 11 of the instrument box 12 box by a steel sheet 64. For the acoustic instrument only, xylophone-like internal keys 66, resting on felt pads 68, within the upper portion 11 of the instrument box. The keys are held in place by plastic posts 72, which in turn are secured to a pair of wooden rails 70 traversing the length of the upper portion of the instrument box.

The xylophone-like keys are made of rectangular steel bars one-half inch in width. The thickness of each bar is 0.095 in. The length of each note's key is as follows:
C (low)=4.49 in.
C#/D♭=4.225 in.
D=4.11 in.
D#/E♭=4.3 in.
E=3.925 in.
F=3.725 in.
F#/G♭=3.61 in.
G=3.515 in.
G#/A♭=3.49 in.
A=3.37 in
A#/B♭=3.2 in.
B=3.16 in.
C (high)=3.05 in.

For the electronic sound producing version of the invention the xylophone-like keys 66 of the acoustic version would be replaced with a circuit board (not shown), a source of electric current, such as a battery or on a line cord supply (not shown), and a speaker (not shown). A nine-volt battery would be adequate for a battery powered instrument. The speaker could be, for example, an 8 ohms, 0.2 watt, 2.25" diameter speaker made by Kobitone of Taiwan.

The electronic instrument permits unique enhancements of the music learning system of the invention. A round "Octave-Up" button 18 can now be added at the far left on the top surface of the instrument box 12 to both turn on the instrument, and with a further presses to shift each of the thirteen buttons to a note one or more octaves higher. At the far right on the top surface of the instrument a square "Mute" button 20 can now be added, which, when pressed, cuts off the sound produced. Utilizing these buttons the students hears exactly what moving an octave up means and understands how the musical scale repeats to cover higher and lower notes. Furthermore, a two-octave range allows any scale (or song derived from it) to be played in at least one full octave, or two octaves for the key of C major. Also essentially, by actively pressing the "Mute" button, the student learns that musical silences, called "rests", are in a sense played like notes and with equal importance to notes.

For the electronic version of the instrument, model 520 series switches made by the E-Switch Company of Brooklyn Park, Minn. replace the aluminum rod buttons used in the acoustic version.

Figure 14:
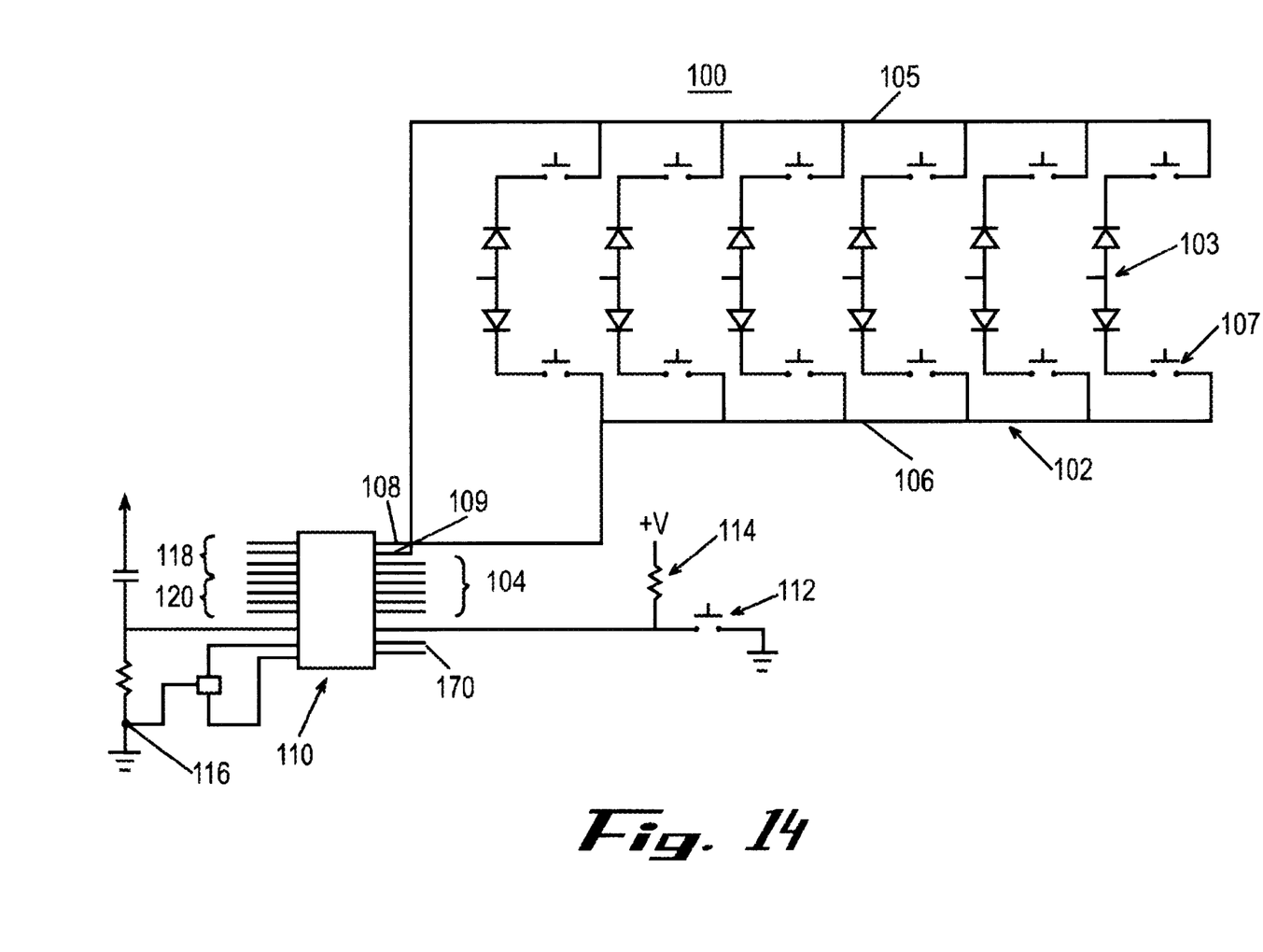
FIG. 14 is a schematic view of one possible electronic key scan circuitry for one electronic version of the instrument of the invention.
Figure 15:
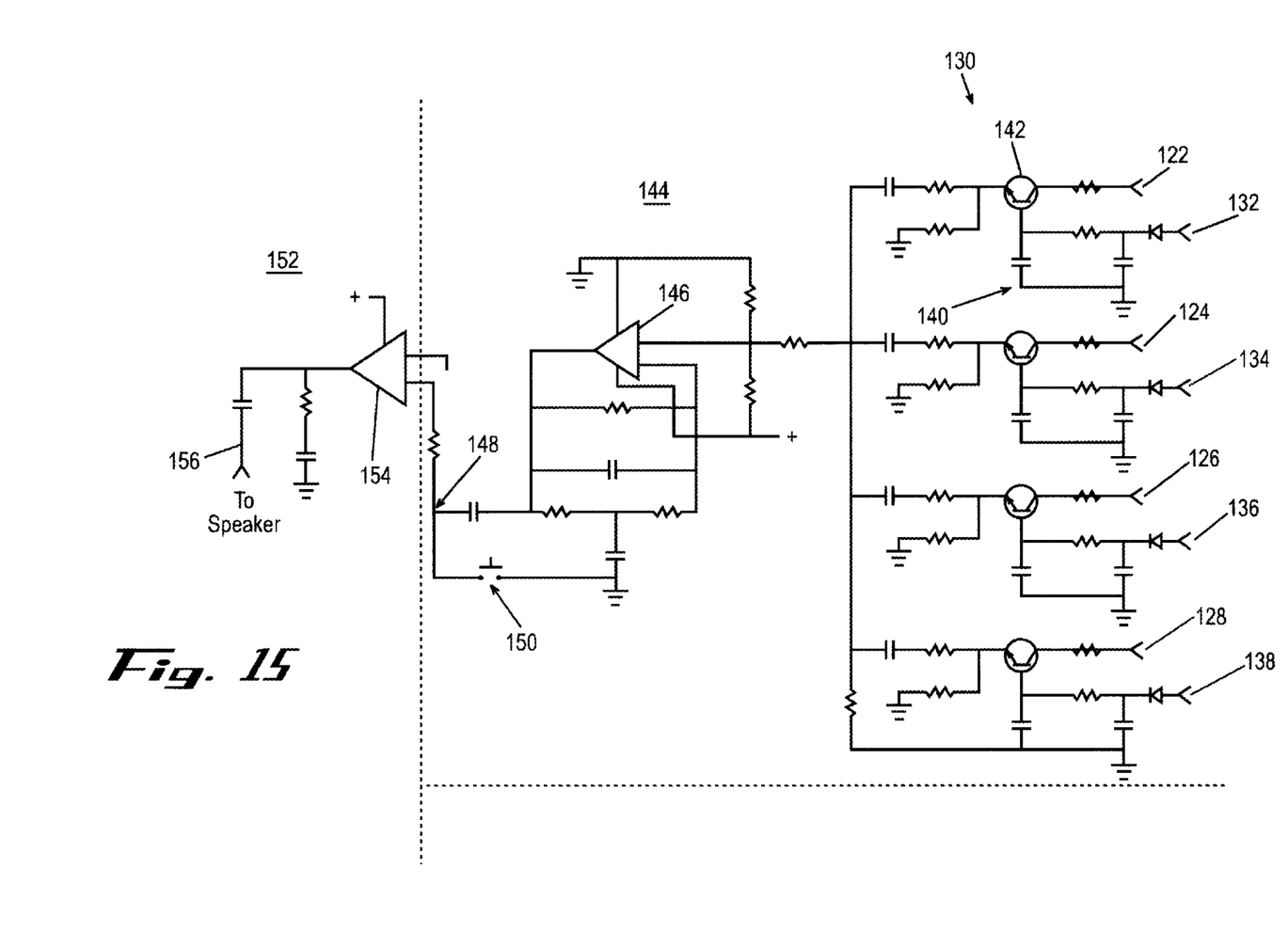
FIG. 15 is a schematic view of one possible electronic band pass filter and power amplifier circuitry for one electronic version of the instrument of the invention.
Figure 16:
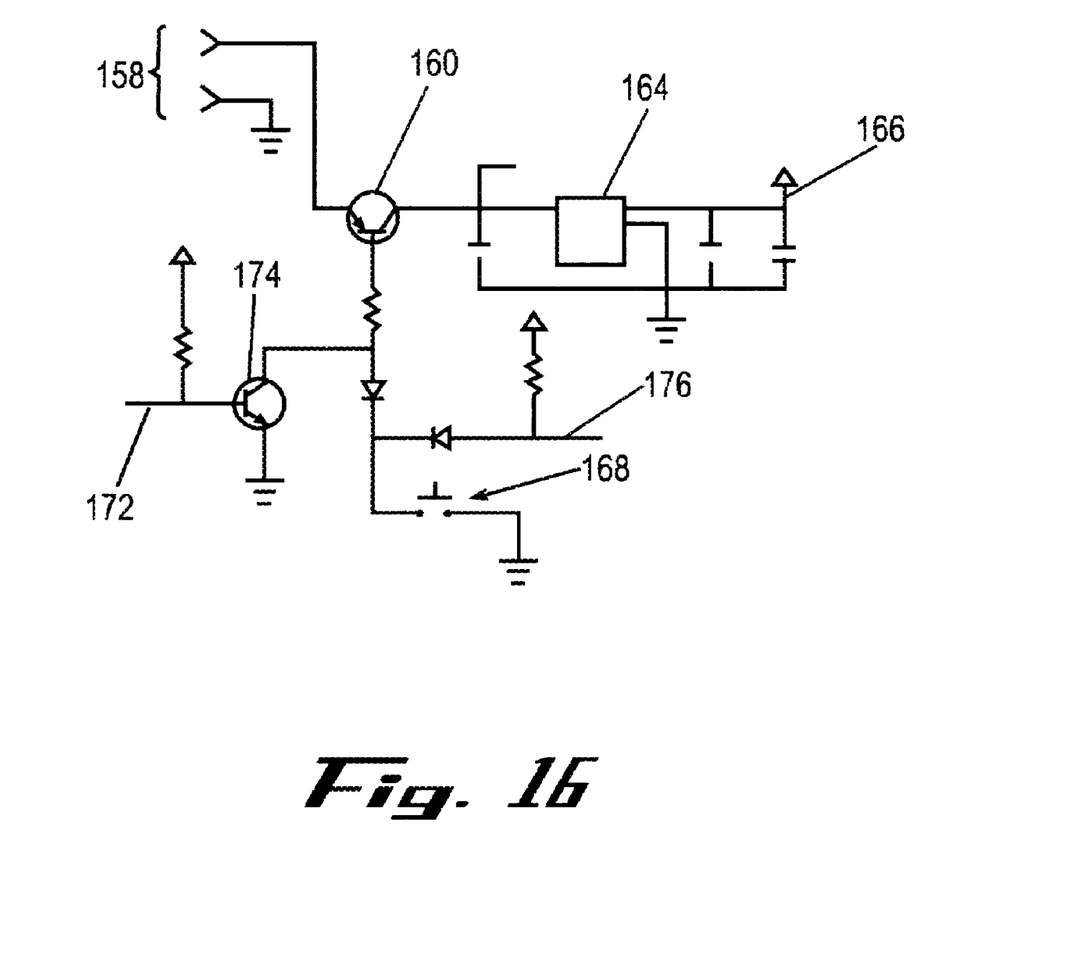
FIG. 16 is a schematic view of one possible electronic circuit to accomplish the turn-on/octave, mute function; and power supply circuitry for one electronic version of the instrument of the invention.

FIGS. 14, 15, and 16 are schematic views of electronic circuitry suitable for implementation of the electronic version of the instrument 10.

FIG. 14 depicts what is referred to as key scan circuitry 100. It includes a 6×2 key matrix 102. The matrix is connected in a known way, with the junction of each pair of diodes, for example 103, connected to a respective one of ports 104. The cathodes of each diode are connected to a common base, either 105 or 106, through a switch, for example 107, which are connected to corresponding inputs 108 or 109 of a microprocessor 110. The latter is available through Phillips Co., under the designation 87C751, and is standard for this type of application. There are twelve such switches in the matrix corresponding to each of twelve buttons, 14 on the instrument. The thirteenth switch 112 is connected through pull-up resistor 114 to the power supply for the circuitry; and connected directly to a respective port of the microprocessor 110. A switch is closed when a corresponding button is depressed.

Standard support components, such as a resistor, capacitor and crystal, are selected and interconnected as at 116, as dictated in the instructions provided by the manufacturer of the microprocessor 110.

The microprocessor is programmed to scan the key matrix and to assign one of four internal tone generator frequencies to the note depressed which corresponds to the frequency of that specific note.

The microprocessor produces two output signals for a given note, one in each of output sets 118 and 120. There are four output lines in each set in this embodiment, corresponding respectively to one of the four tone frequencies programmed into the microprocessor.

Each output line in set 118 is connected to a respective one of collector supply lines 122, 124, 126, or 128 of keyer circuitry 130.

Each output line in set 120 is connected to a respective one of base drive lines 132, 134, 136, or 138 of the circuitry 130.

The voltage appearing at one or more of the collector supply lines is a zero (0) to $V_1$ square wave having a frequency corresponding to one of the tone generator frequencies depending further on the button depressed, where $V_1$ is the circuit supply voltage. The voltage appearing at one or more of the base drive lines is a 0 to $V_1$ gate voltage which is generated when a corresponding collector supply line voltage is generated. A respective base drive voltage is shaped by filter network, for example 140, which in turn shapes the current flowing in a respective transistor, for example 142.

The outputs of one or more of the four channels of the keyer circuitry are summed together and supplied to the input of a band pass filter 144 utilizing an operational amplifier 146 and various resistive and capacitive elements, all configured in a known manner, to filter out unwanted harmonics. The band pass filter is designed to be centered at 800 HZ. The output 148 of the band pass filter is connected through switch 150 to circuit ground. Switch 150 is activated by the "Mute" bar or button 20 and will clamp the output of the filter circuit to ground thereby precluding its amplification by power amplifier stage 152. This section utilizes a low voltage audio power amplifier 154, for example, a LM386, configured in a known manner to drive the speaker noted above, (not shown) connected to the output 156.

In FIG. 16, the power supply, enabling and octave change circuitry are shown. The circuitry receives a 9 volt, DC voltage supplied by a battery, not shown, at input terminals 158. The dc voltage is supplied through transistor 160 to voltage regulator circuitry 162 employing a standard 78 L 05, 164, made by National Semiconductor Co., for example. This provides a $V_1$ voltage of 5 volts at output 166 to supply the various circuits.

The power supply is activated by depressing the "Octave-Up" button 20 which doubles as a "power on" button. The button when first depressed enables switch 168, connecting the base of transistor 160 to ground to thereby energize regulator 164 resulting in the circuit supply voltage $V_1$ at output 166 and throughout the circuitry. The microprocessor 110 is of course energized as well and is internally programmed to provide a latching signal at port 170 which is connected back to input 172 at the base of switching transistor 174 in parallel with mechanical switch 168. This "latches" the power supply circuitry in an "on" condition which continues after release of button 20 and the opening of mechanical switch 168. The microprocessor will have a built in delay which will remove the latch up voltage at port 170 after a predetermined period of non-use, thus turning off the power supply, to thereby minimize power drain from the battery.

After turn-on, and if there is a desire by the operator to change octaves, button 20 is again depressed and switch 168 closes resulting in a negative excursion of voltage at octave change output 176 which is tied to port 170 but is recognized by the programmed microprocessor as a command to change the tone frequencies by an octave amount. The software will permit another octave change upward with yet another depression of button 20. On the next attempt to change the octave, the microprocessor reverts to the initial tone settings of the lowest octave.

The various components depicted, and their relative values and ratings where appropriate, in FIGS. 14, 15 and 16 are all well known to or determinable by those of ordinary skill in this area of circuit design. The components can be mounted on a suitable printed circuit board which provides the necessary interconnections. The completed circuit assembly can then be positioned in the substantial hollow interior area in upper section 11 and secured in a suitable way.

A suggested method for using the present invention to learn music basics would be as follows:

Step 1: Student is instructed to first acquaint himself with the musical alphabet using Attachment 4. (Note: The student correctly looks at Attachment 4 first rather than Attachment 1. However, when it comes to playing a tune, the student uses Attachments 1, 2, 3, 4 in order, hence the logic of the numbering.)

Step 2: Use Attachment 2 to help you play the C major scale, and thereby become familiar with the natural notes.

Step 3: Play one or more familiar songs (in the key of C) (from a book or manual that would be supplied) using Attachment 2, which allows the student to match up the standard notation on the sheet music with the standard notation and note names on the Attachment, and with the appropriate button to press to sound a certain note. Because the student will recognize the tune, it is not necessary for he or she to completely understand the rhythmic notation in order to make the song sound right.

Step 4: Learn about other key concepts, such as rhythmic notation and sharps and flats.

Step 5: Backtrack. Clap or play the rhythms of the previous familiar tune on one note. Learn the counting of the rhythms. Perhaps incorporate use of a metronome at progressively more challenging tempos (speeds).

Step 6 (optional): Play a familiar song from color-coded sheet music using Attachment 1. Actually, the student can try this at any time, and probably will be tempted to do so. However, the layout of this method encourages the student to at least try to work with some form of standard notation first because it has greater, more universal, educational value.

Step 7: Play the song again with Attachment 2, this time keeping track of the rhythm and trying to rely less on the aid of the Attachment—It is a crutch that will soon be removed.

Step 8: Play the song with Attachment 3, which has musical notation, but lacks note names. One less learning aid means the student has to internalize more information.

Step 9: Play the song with Attachment 4, which just gives the note names, which are not written anyway in the sheet music—meaning this last crutch gives only minimal assistance to the student.

Step 10: Play the song with no Attachment. By now the student should be up an running on his or her own.

Obviously there should be some flexibility in the learning sequence because no two students learn exactly alike.

Thus it can be seen that the music learning system of the present invention provides a valuable new instrument and a method for learning music. The invention provides a clear and elegant learning method in which musical concepts relate to physical parts of the instrument and then to the sound produced by the instrument. The present invention makes it less frustrating and intimidating to begin to read and play music by allowing the satisfaction of playing recognizable songs virtually right away (using the color-coded Attachment 1 and color-coded sheet music), while also allowing the teacher or student to set higher levels of challenge (using the other Attachments or no Attachment at all). While the natural notes are evident and can be focused on at first, the other chromatic notes are also available for more advanced study.

While the present invention has been disclosed in connection with versions shown and described in detail, various modifications and improvements will become readily apparent to those skilled in the art. For example, new attachments may include depictions of the several instruments the invention of the present invention can imitate—which could add to the fun either in the classroom or at home—or others. Even braille attachments for the blind may be employed. Further, other clefs can be employed, for example the bass clef(with perhaps a shifting of the pitch range of the instrument) and the tenor clef. Additional features might include multiple timbres rather than just one, including at minimum the sounds of the instruments, the instrument of the present invention can mimic, or others.

Accordingly, the spirit and scope of the present invention is to be limited only by the following claims.

What is claimed is:

1. A system for learning music, comprising:
   (a) a box;
   (b) said box being greater in length than in width;
   (c) said box having a top surface, a left and right side end portion, a base portion and a hollow, internal area;
   wherein said top surface comprises an upper portion and a lower portion separated by a middle area portion extending a substantial portion of the length of said box;
   (d) at least eight depressible buttons disposed in said middle portion of said top surface along the length of said box;
   (e) means for sounding musical notes when one or more fingers of an operator presses down on one or more of said buttons, said musical notes being different from one another and corresponding to each one of said at least eight buttons, said means for sounding musical notes disposed in said hollow internal area; and,
   (f) a series of at least two attachments, wherein each one of said at least two attachments comprises at least one linear strip of material including an upper surface and a lower surface, said lower surface of each one of said at least two attachments adapted to be disposed upon the top surface of said box, said at least one linear strip of said at least two attachments disposed on said upper portion or said lower portion, each one of said at least two attachments having respective indicia disposed upon the upper surface thereof, viewable to the operator, said indicia having a predetermined relationship to each one of said depressible buttons, so that when each said attachment is disposed upon the top surface in accordance with a set sequence, said operator is assisted in learning music over a period of time as he depresses said buttons.

2. The system for learning music according to claim 1 further comprising at least thirteen, successively disposed depressible buttons, said thirteen successively disposed buttons when depressed by said operator dividing a musical octave in half step tones, eight of said at least thirteen buttons sounding natural notes and five of said at least thirteen buttons sounding sharp or flat notes relative to an adjacent natural note.

3. The system for learning music according to claim 2 wherein one of said at least two attachments utilizes indicia including eight different colors imprinted thereon to color-code each of the eight natural notes, said upper portion of said first attachment further including indicia, disposed above the buttons corresponding to the sharp note for the immediately adjacent, lower natural note including the color associated with the immediately adjacent, lower natural note, and indicia disposed below the buttons corresponding to the flat note for the immediately adjacent, higher natural note, including the color associated with the immediately adjacent, higher natural note.

4. The system for learning music according to claim 2 wherein the indicia on one of said at least two attachments includes note names, said note names being positioned in line with and corresponding musically to each one of said at least thirteen buttons said indicia further including musical notes disposed on a staff notation, said musical notes on said staff notation being positioned in line with and corresponding musically to each one of said at least thirteen buttons.

5. The system for learning music according to claim 2 wherein the indicia on one of said at least two attachments includes musical notes disposed on a staff notation, said musical notes on said staff notation being positioned in line with and corresponding musically to each one of said at least thirteen buttons.

6. The system for learning music according to claim 2 wherein the indicia on one of said at least two attachments includes note names, said note names being positioned in line with and corresponding musically to each one of said at least thirteen buttons.

7. The system for learning music according to claim 2 wherein said cooperating means for temporary attachment of said linear strip comprises at least one strip of VELCRO™ being affixed to said top surface of said box, and at least one cooperating strip of VELCRO™ being affixed to said underlying surface of each said at least two attachments.

8. The system for learning music according to claim 2 wherein said means for sounding musical notes is electronic.

9. The system for learning music according to claim 8 further comprising means for enabling said operator to sound a note at least one octave higher corresponding to each one of said musical notes.

10. The system for learning music according to claim 8 further comprising means for enabling said operator to temporarily silence a note being produced at the same time by a manipulation of said operator.

11. The system for learning music according to claim 2 wherein said box has a configuration that allows it to be held in at least two positions while notes are sounded, said at least two held positions corresponding to how at least two musical instruments are held, said two musical instruments consisting of a guitar and a horn.

12. The system for learning music according to claim 1 wherein said means for sounding musical notes is acoustic.

13. The system for learning music according to claim 1 wherein said means for sounding musical notes is electronic.

14. The system for learning music according to claim 13 further comprising means for enabling said operator to sound a note at least one octave higher corresponding to each one of said musical notes.

15. The system for learning music according to claim 13 further comprising means for enabling said operator to temporarily silence a note being produced at the same time by a manipulation of said operator.

16. The system for learning music according to claim 1 wherein said box has a configuration that allows it to be held in at least two positions while notes are sounded, said at least two held positions corresponding to how at least two musical instruments are held, said two musical instruments consisting of a guitar and a horn.

17. An instrument for learning music comprising:
(a) a box;
(b) said box being greater in length than in width;
(c) said box having a top surface, a left and right side end portion, a base portion and a hollow, internal area;
(d) at least thirteen depressible buttons disposed in said top surface along the length of said box;
(e) means for sounding musical notes when one or more fingers of an operator presses down on one or more of said buttons, said musical notes being different from one another and corresponding to each one of said at least thirteen buttons, each said musical note representing a half tone in a musical octave, said musical notes representing natural notes and respective sharp and flat notes corresponding to adjacent natural notes, said means for sounding musical notes disposed in said hollow internal area; and,
(f) an attachment, said attachment being a planar strip of material including an upper surface and a lower surface, said attachment adapted to be disposed upon the top surface of said box in predetermined relationship to said buttons, said attachment having respective indicia disposed upon the upper surface thereof, viewable to the operator, said indicia having a predetermined relationship to each one of said depressible buttons, said attachment utilizing indicia including eight different colors imprinted thereon to color-code each of the eight natural notes, said upper portion of said attachment further including indicia, disposed above the buttons corresponding to the sharp note for the immediately adjacent, lower natural note including the color associated with the immediately adjacent, lower natural note, and indicia disposed below the buttons corresponding to the flat note for the immediately adjacent, higher natural note, including the color associated with the immediately adjacent, higher natural note, so that when said attachment is disposed upon the top surface of said box, said operator is assisted in learning music over a period of time as he depresses said buttons.

18. A method for learning music wherein a student employs the steps of:
(a) using a system as claimed in claim 2;
(b) selecting one attachment of said at least two attachments from a group of at least four attachments in accordance with a predetermined instructional plan and sequence, said group of at least four attachments including,
(i) a first attachment, wherein said indicia includes eight different colors imprinted thereon to color-code each of the eight natural notes, said upper portion of said first attachment further including indicia, disposed above the buttons corresponding to the sharp note for the immediately adjacent, lower natural note including the color associated with the immediately adjacent, lower natural note, and indicia disposed below the buttons corresponding to the flat note for the immediately adjacent, higher natural note, including the color associated with the immediately adjacent, higher natural note, (ii) a second attachment, wherein the indicia includes note names, said note names being positioned in line with and corresponding musically to each one of said at least thirteen buttons said indicia further including musical notes disposed on a staff notation, said musical notes on said staff notation being positioned in line with and corresponding musically to each one of said at least thirteen buttons, (iii) a third attachment, wherein the indicia includes musical notes disposed on a staff notation, said musical notes on said staff notation being positioned in line with and corresponding musically to each one of said at least thirteen buttons, and, (iv) a fourth attachment, wherein the indicia includes note names, said note names being positioned in line with and corresponding musically to each one of said at least thirteen buttons;

(c) disposing the one attachment selected in step (b) on the top surface of said box;

(d) familiarizing oneself as said student with the relationship of musical tones produced by depressing one or more of said buttons, and the corresponding indicia on said one attachment for said one or more buttons in accordance with said predetermined plan;

(e) replacing said one attachment selected in step (b) with an other attachment selected from said group of at least four attachments; and, (f) familiarizing oneself as said student with the relationship of musical tones produced by depressing one or more of said buttons, and the corresponding indicia on said other attachment for said one or more buttons in accordance with said predetermined plan.

19. The method claimed in claim 18 further comprising the steps of:

(g) replacing the attachment selected in either step (b) or step (e) with yet another attachment selected from said group of at least four attachments; and, (h) familiarizing oneself as said student with the relationship of musical tones produced by depressing one or more of said buttons, and the corresponding indicia on said yet another attachment for said one or more buttons in accordance with said predetermined plan.

20. The method claimed in claim 19 further comprising the steps of:

(i) replacing the attachment selected in either step (b) or step (e) or step (g) with still yet another attachment selected from said group of at least four attachments; and, (j) familiarizing oneself as said student with the relationship of musical tones produced by depressing one or more of said buttons, and the corresponding indicia on said still yet another attachment for said one or more buttons in accordance with said predetermined plan.

21. The method claimed in claim 20, wherein said student further employs the step of familiarizing himself with the relationship of musical tones produced by corresponding buttons by playing one or more songs disposed on accompanying sheet music with indicia corresponding, at least in part, to the indicia set out on one or more of said group of at least four attachments.

22. The method claimed in claim 19, wherein said student further employs the step of familiarizing himself with the relationship of musical tones produced by corresponding buttons by playing one or more songs disposed on accompanying sheet music with indicia corresponding, at least in part, to the indicia set out on one or more of said group of at least four attachments.

23. The method claimed in claim 18, wherein said student further employs the step of familiarizing himself with the relationship of musical tones produced by corresponding buttons by playing one or more songs disposed on accompanying sheet music with indicia corresponding, at least in part, to the indicia set out on one or more of said group of at least four attachments.

* * * * *